Aug. 30, 1932.
J. W. WATSON
1,874,724
MULTIPLE LEAF SPRING
Filed July 24, 1930
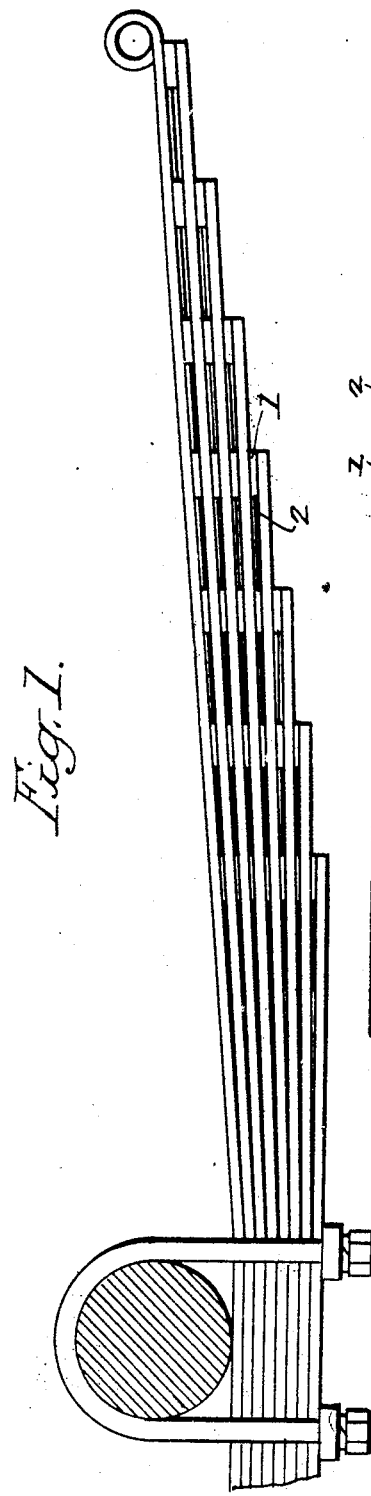
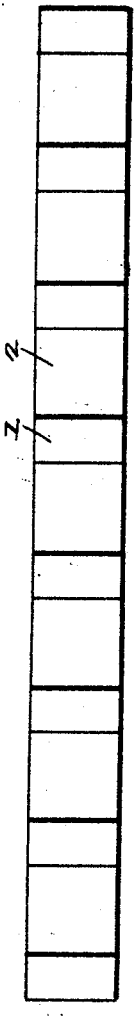
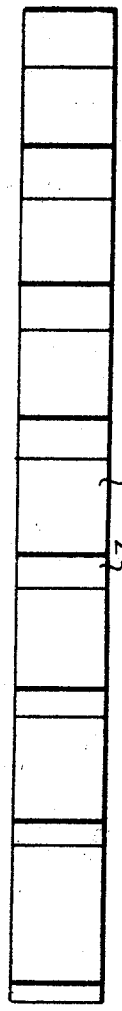
Inventor:
John Warren Watson
by his Attorneys
Howson & Howson Patented Aug. 30, 1932

1,874,724

UNITED STATES PATENT OFFICE

JOHN WARREN WATSON, OF WAYNE, PENNSYLVANIA

MULTIPLE LEAF SPRING

Application filed July 24, 1930. Serial No. 470,476.

This invention relates to a new construction for multiple leaf springs and in particular for multiple leaf springs for supporting the bodies of motor cars, railway cars and other vehicles, and has for its purpose the same general objects, features and advantages disclosed in my Patent No. 1,759,722, dated May 20, 1930, for a multiple leaf spring, and in addition thereto, the present invention has for a further principal object to reduce the amount of rubber to be stretched by a given interleaf movement while still providing for the proper separation of the leaves and also for their adequate support.

When used in conjunction with springs of certain designs, I have found that interleaf rubber members (of the continuous or solid kind disclosed in my above patent) when made sufficiently long to properly separate and support the leaves, cause, for any given interleaf movement, the stretching of so much rubber as to interfere with the proper yielding of the spring and also cause so much energy to be stored in the stretched rubber as to cause a too rapid or snappy return of the spring to normal.

Under certain conditions the use of relatively short rubber members running for but a few inches inward from the ends of the leaves produces more desirable spring action and reaction than can be obtained from the use of relatively longer rubber members. These relatively shorter members, however, do not hold the leaves separated over a sufficient portion of their length, nor do they provide a proper distribution of forces or support for the leaves.

By the present invention, as will be seen by the accompanying drawing and specifications, I provide an intermittent contact between the rubber and the spring leaves and at the same time provide a sufficient distribution of the rubber along the spring length to adequately separate the leaves, adequately distribute the forces, and adequately support the leaves. This reduction in the area of pressure contact between the rubber and the leaves reduces the amount of rubber which has to be stretched by any given interleaf movement.

The few designs shown herewith are merely by way of example to indicate the endless variety of designs which are possible to reduce the amount of rubber to be stretched while still maintaining adequate separation and support of the spring leaves.

In the accompanying drawing:

Figure 1 is a longitudinal side elevation of a half portion of a conventional vehicle spring equipped with my intermittent type of insert;

Fig. 2 is a plan view of the longest of the inserts shown in Fig. 1;

Fig. 3 is a plan view of a rubber insert showing a design of insert similar to that shown in Figs. 1 and 2, but wherein the area of contact portions as well as the area of the web or space between the contact portions is varied. Under certain conditions it may be found advantageous to thus in some form vary the contact areas or the spaces between the contact areas, or both, at some portion of or throughout the length of the leaves to be separated;

Fig. 4 is a plan view of a rubber member showing a design wherein the contacting portions of the member run lengthwise of the spring instead of crosswise as in Figs. 1, 2 and 3;

Fig. 5 is a cross section on line 4—4, Fig. 4;

Fig. 6 is a plan view of a rubber member showing a still further modification of design, and Fig. 7 is a cross section on line 6—6, Fig. 6.

It is to be understood that, in the design examples shown or in any other form of design, the ratio between the contacting areas and the non-contacting areas may be varied to suit conditions and may be made of a uniform ratio throughout the length of the member or may be varied in some such manner as shown in Fig. 3.

In each of the figures shown, 1 indicates the area which will be in pressure contact with the spring leaves, and 2 indicates the web or area which will not be in pressure contact with the leaves.

All of these designs have for their object to reduce, for any desired length of spring leaf support, the area of pressure contact between the rubber and the spring leaf, thus reducing, as desired, the amount of rubber which must be stretched by any given interleaf movement.

When interleaf rubber inserts of a uniform thickness throughout their length are employed, it is obvious that when the leaves are bolted together and then further clamped together to securely hold them to the axle or other vehicle part, or, in other words, when the spring is put into service, the rubber inserts will be caused to become tapered, they being squeezed relatively thinner adjacent the clamp than as they extend toward the end of the leaves and thus progressively away from the influence of the clamp. If this rate or degree of taper which is caused by the clamping action alone is not found to be sufficient for certain specific applications, I provide various means as follows for accentuating the natural rate or degree of tapered separation of the spring leaves. As illustrated in Fig. 1, I do this by making the rubber spacers normally thicker as these spacers are positioned progressively farther away from the point where the spring leaves are clamped or held together. This, as is the case with the tapered members shown in my patent above mentioned, provides a thickness of rubber more or less in proportion at all points to the amount of interleaf movement, the movement being greater and the rubber being thicker adjacent the ends of the leaves than adjacent the point where the leaves are clamped together. Similar accentuation of the degree or rate of taper may be obtained in the manner shown in Fig. 3, wherein the contacting areas are small adjacent the clamped portion and are made progressively greater as they are positioned away from the clamped portion and toward the ends of the spring leaves. Also as shown in Fig. 3, the non-contacting areas or spaces between the contacting areas may be made greater adjacent the clamped portion and progressively smaller as they occur toward the ends of the spring leaves. Any of these means for ascertaining the rate or degree of taper may be employed separately or in conjunction with one another.

Still another means which may be employed for accentuating the degree or rate of tapered separation of the leaves, and which may be employed alone or in conjunction with any or all of the above means, is to vary the composition or softness of the rubber between the end of the spring leaves and the clamped portion. This variation may be accomplished all in the one strip by placing in a single vulcanizing mold sections of various rubber compositions, or the pieces of various composition may be molded separately and placed between the spring leaves in proper relation to one another.

I prefer that the portions of these rubber members which are designed for pressure contact with the spring leaves be joined together by the thinner portions or webs 2 in the various figures, but these web portions may be omitted in designs such for example as shown in Fig. 6 and even in designs such as shown in Figs. 1 and 3, if desired, inasmuch as the essence of this invention is to minimize or reduce the amount of rubber which has to be stretched by any given interleaf movement while still providing a sufficient distribution of rubber along the spring length to maintain adequate separation and support of the spring leaves. To insure ease and accuracy of any predetermined installation as well as a great saving in manufacturing and distributing handling of parts and to make possible numerous other economies, the strip or tied-together form of insert will be found greatly superior to any method involving the handling, codifying, distributing and correct installing of separate pieces as suggested above in the case of designs such as are shown in Figs. 1 and 3.

To aid in installation, for appearance, or to more securely hold the rubber from creeping sideways between the leaves, longitudinal flanges of rubber to overhang the edges of the spring leaves may be added to any design of insert.

In addition to all of the above, this invention is of great value commercially over my invention disclosed in the patent above referred to in that it makes possible a very substantial saving of the rubber material and hence the cost for the equipment of any given spring.

I claim:

1. In a multiple leaf spring, means for clamping the leaves together and rubber means for separating and supporting adjacent ones of said leaves, said rubber means extending from adjacent the end of one of said leaves toward said clamping means, said rubber means contacting intermittently with the surface of one of said leaves.

2. In a multiple leaf spring, means for clamping the leaves together and rubber means for separating and supporting adjacent ones of said leaves, said rubber means extending from adjacent the end of one of said leaves for more than half way toward said clamping means, said rubber means contacting intermittently with the surface of one of said leaves.

3. In a multiple leaf spring, means for clamping the leaves together and rubber means for separating and supporting adjacent ones of said leaves, said rubber means extending from adjacent the end of one of said leaves toward said clamping means, said rubber means contacting intermittently with the surface of one of said leaves, said rubber means being so constructed as to hold the leaves progressively farther separated as said leaves extend away from the clamping means.

4. In a multiple leaf spring, means for clamping the leaves together and rubber means for separating and supporting adjacent ones of said leaves, said rubber means extending from adjacent the end of one of said leaves for more than half way toward said clamping means, said rubber means contacting intermittently with the surface of one of said leaves, said rubber means being so constructed as to hold the leaves progressively farther separated as said leaves extend away from the clamping means.

5. In a multiple leaf spring, means for clamping the leaves together and a rubber member for separating and supporting adjacent ones of said leaves, said rubber member extending from adjacent the end of one of said leaves toward said clamping means, said rubber member contacting intermittently with the surface of one of said leaves.

6. In a multiple leaf spring, means for clamping the leaves together and rubber members for separating and supporting adjacent ones of said leaves, said rubber members extending lengthwise of the said leaves for more than half way toward said clamping means, one of said rubber members contacting intermittently with the surface of one of said leaves.

7. In a multiple leaf spring, means for clamping the leaves together and a rubber member for separating and supporting adjacent ones of said leaves, said rubber member extending from adjacent the end of one of said leaves toward said clamping means, said rubber member contacting intermittently with the surface of one of said leaves, said rubber member being so constructed as to hold the leaves progressively farther separated as said leaves extend away from the clamping means.

8. In a multiple leaf spring, means for clamping the leaves together and rubber members for separating and supporting adjacent ones of said leaves, said rubber members extending lengthwise of the said leaves for more than half way toward said clamping means, one of said rubber members contacting intermittently with the surface of one of said leaves, said rubber members being so constructed as to hold the leaves progressively farther separated as said leaves extend away from the clamping means.

9. In a multiple leaf spring, means for clamping the leaves together and rubber means for separating and supporting adjacent ones of said leaves, said rubber means extending from adjacent the end of one of said leaves toward said clamping means, the area of pressure contact between said rubber means and one of said leaves being less than the area of that portion of the leaf length which is defined by the boundaries of said rubber means.

10. In a multiple leaf spring, means for clamping the leaves together and rubber means for separating and supporting adjacent ones of said leaves, said rubber means extending from adjacent the end of one of said leaves for more than half way toward said clamping means, the area of pressure contact between said rubber means and one of said leaves being less than the area of that portion of the leaf length which is defined by the boundaries of said rubber means.

11. In a multiple leaf spring, means for clamping the leaves together and rubber means for separating and supporting adjacent ones of said leaves, said rubber means extending from adjacent the end of one of said leaves toward said clamping means, the area of pressure contact between said rubber means and one of said leaves being less than the area of that portion of the leaf length which is defined by the boundaries of said rubber means, said rubber means being so constructed as to hold the leaves progressively farther separated as said leaves extend away from the clamping means.

12. In a multiple leaf spring, means for clamping the leaves together and rubber means for separating and supporting adjacent ones of said leaves, said rubber means extending from adjacent the end of one of said leaves for more than half way toward said clamping means, the area of pressure contact between said rubber means and one of said leaves being less than the area of that portion of the leaf length which is defined by the boundaries of said rubber means, said rubber means being so constructed as to hold the leaves progressively farther separated as said leaves extend away from the clamping means.

13. In a multiple leaf spring, means for clamping the leaves together and a rubber member for separating and supporting adjacent ones of said leaves, said rubber member extending from adjacent the end of one of said leaves toward said clamping means, the area of pressure contact between said rubber member and one of said leaves being less than the area of that portion of the leaf length which is defined by the boundaries of said rubber member.

14. In a multiple leaf spring, means for clamping the leaves together and rubber members for separating and supporting adjacent ones of said leaves, said rubber members extending lengthwise of the said leaves for more than half way toward said clamping means, the area of pressure contact between one of said rubber members and one of said leaves being less than the area of that portion of the leaf length which is defined by the boundaries of said rubber member.

15. In a multiple leaf spring, means for clamping the leaves together and a rubber member for separating and supporting adjacent ones of said leaves, said rubber member extending from adjacent the end of one of said leaves toward said clamping means, the area of pressure contact between said rubber member and one of said leaves being less than the area of that portion of the leaf length which is defined by the boundaries of said rubber member, said rubber member being so constructed as to hold the leaves progressively farther separated as said leaves extend away from the clamping means.

16. In a multiple leaf spring, means for clamping the leaves together and rubber members for separating and supporting adjacent ones of said leaves, said rubber members extending lengthwise of the said leaves for more than half way toward said clamping means, the area of pressure contact between one of said rubber members and one of said leaves being less than the area of that portion of the leaf length which is defined by the boundaries of said rubber member, said rubber members being so constructed as to hold the leaves progressively farther separated as said leaves extend away from the clamping means.

JOHN WARREN WATSON.